United States Patent [19]
Meyer

[11] B 3,923,878
[45] Dec. 2, 1975

[54] DISTYRYLBENZENE DERIVATIVES

[75] Inventor: Hans Rudolf Meyer, Basel, Switzerland

[73] Assignee: Ciba-Geigy AG, Basel, Switzerland

[22] Filed: May 18, 1972

[21] Appl. No.: 254,708

[44] Published under the Trial Voluntary Protest Program on January 28, 1975 as document no. B 254,708.

[30] Foreign Application Priority Data
June 7, 1971  Switzerland............ 8327/71

[52] U.S. Cl................ 260/505 C; 8/1 W; 106/81; 252/558; 260/551 R
[51] Int. Cl.$^2$............................ C07C 143/24
[58] Field of Search............. 260/505 R, 505 C

[56] References Cited
UNITED STATES PATENTS

| | | | |
|---|---|---|---|
| 2,527,427 | 10/1950 | Keller et al. | 260/505 |
| 2,547,910 | 4/1951 | Hausermann et al. | 260/505 |
| 2,681,926 | 6/1954 | Lane et al. | 260/505 |

*Primary Examiner*—James O. Thomas, Jr.
*Assistant Examiner*—Alan Siegel
*Attorney, Agent, or Firm*—Joseph G. Kolodny; Prabodh I. Almaula; Edward McC. Roberts

[57] ABSTRACT

The present invention provides new distyrylbenzene derivatives of the formula

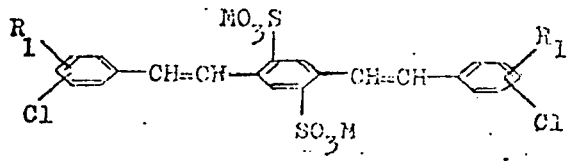

wherein $R_1$ represents hydrogen or chlorine and, if $R_1$ represents chlorine, the chlorine atoms assume the positions 2, 4 or 3, 4, and M denotes a hydrogen atom, an alkali metal ion or an ammonium ion.

These new compounds are useful optical brighteners for organic materials, especially cellulose and polyamide.

4 Claims, No Drawings

DISTYRYLBENZENE DERIVATIVES

The present invention relates to selected new derivatives of distyrylbenzene containing sulpho groups, their manufacture and their use as optical brighteners for organic materials, especially cellulose and polyamide.

A considerable number of derivatives of distyrylbenzene have already been disclosed and in connection therewith the possibilities of substitution by sulpho groups have also been indicated. Whilst in these cases in general all 14 possible positions and conceivable multiple substitutions are generally left open, more concrete disclosures are restricted to compounds in which sulpho groups are present in the styryl radicals arranged symmetrically relative to the central phenylene group.

In contrast thereto it has now been found that a specific substitution by sulpho groups in the central phenylene group, with simultaneous absence of sulpho groups in the styryl radicals, leads to compounds which are optical brighteners having advantageous properties.

The new distyrylbenzene derivatives according to the present invention correspond to the general formula (1) 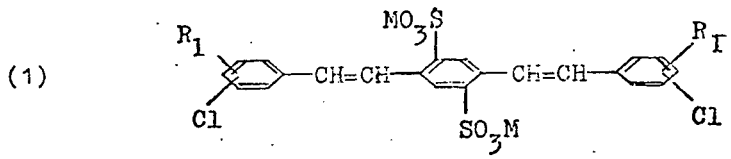

wherein $R_1$ represents hydrogen or chlorine and, if $R_1$ represents chlorine, the chlorine atoms assume the positions 2, 4 or 3,4, and M denotes a hydrogen atom, an alkali metal ion or an ammonium ion.

Compounds of particular practical importance are those of the formula (2) 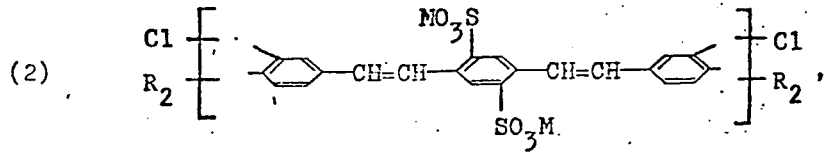

wherein $R_2$ denotes hydrogen or chlorine and M denotes a hydrogen atom or an alkali metal or ammonium ion.

The new compounds can be manufactured analogously to processes which are in themselves known. An appropriate procedure is to react about 1 mol equivalent of the dialdehyde of the formula (3) 

with about 2 mol equivalents of a compound of the formula (4) 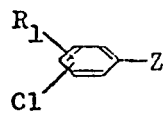

with $R_1$ in this formula having the abovementioned meaning and Z representing a group (5a) $-CH_2-\overset{O}{\underset{OR}{\overset{\|}{P}}}-OR$,  (5b) $-CH_2-\overset{O}{\underset{R}{\overset{\|}{P}}}-OR$, (5c) $-CH_2-\overset{O}{\underset{R}{\overset{\|}{P}}}-R$  or  (5d) $-CH=\overset{R}{\underset{R}{\overset{|}{P}}}-R$ wherein R represents lower alkyl or phenyl.

The dialdehyde of the formula (3) which is here required as the starting substance is obtained by reaction of the dialdehyde of the formula (6) 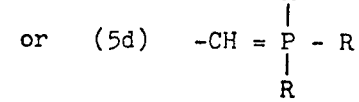

with at least 2 mol equivalents of a sulphite in an aqueous medium at temperatures between 110° and 220°C, preferably at 130° to 190°C, in an autoclave under pressure. The replacement of the halogen group by the sulpho group takes place at the upper temperature limit if halogen denotes chlorine and at the lower temperature limit if halogen denotes bromine.

The phosphorus compounds of the formula (4) required as the second component are obtained in a manner which is in itself known, if halogenomethyl compounds, preferably chloromethyl or bromomethyl compounds, of the formula (7) 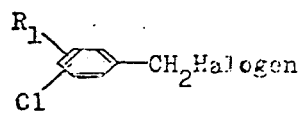

are reacted with phosphorus compounds of the formulae

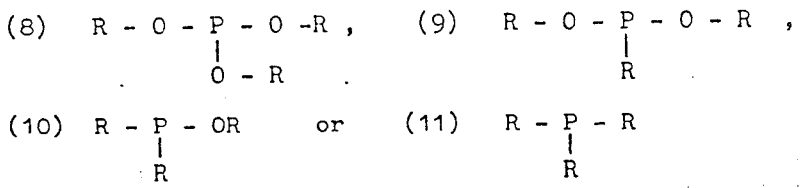

In these formulae, R has the indicated meaning, with radicals R bonded to oxygen being preferably lower alkyl groups, whilst radicals R bonded directly to phosphorus are preferably aryl radicals, such as benzene radicals. The phosphorus compounds of the formula (5c) can also be obtained by reaction of halogenomethyl compounds, preferably chloromethyl or bromomethyl compounds, of the formula (7) with P-chlorodiphenylphosphine and subsequent reaction with an alcohol of the formula R-OH (the meaning of R being as defined above), for example with methanol or with water.

The manufacturing process of the distyrylbenzene derivatives is advantageously carried out in inert solvents. As examples thereof there may be mentioned hydrocarbons such as toluene and xylene or alcohols, such as methanol, ethanol, isopropanol, butanol, glycols, glycol ethers such as 2-methoxyethanol, hexanols, cyclohexanol and cyclooctanol, and also ethers such as diisopropyl ether, tertrahydrofurane and dioxane as well as dimethylsulphoxide, formamide and N-methylpyrrolidone. Polar organic solvents such as dimethylformamide and dimethylsulphoxide are particularly suitable. Some of the reactions can also be carried out in aqueous solution.

The temperature at which the reaction is carried out can vary within wide limits. It is determined α. by the stability of the solvent used towards the reactants, especially towards the strongly basic alkali compounds, β. by the reactivity of the condensation partners and γ. by the effectiveness of the combination of solvent-base as a condensation agent.

In practice, accordingly, temperatures of between about 10° and 100°C are in general used, especially if dimethylformamide or dimethylsulphoxide are used as solvents. The preferred temperature range is 20° to 60°C. However, under certain circumstances higher temperatures can also be used, if this is desirable for reasons of time-saving or if a less active but cheaper condensation agent is to be employed. In principle, reaction temperatures in the range of 10° to 180°C are thus also possible.

Possible strongly basic alkali compounds are above all the hydroxides, amides and alcoholates (preferably those of primary alcohols containing 1 to 4 carbon atoms) of the alkali metals, and for economic reasons those of lithium, sodium and potassium are of predominant interest. Fundamentally, and in special cases, it is however also possible successfully to employ alkali sulphides and alkali carbonates, aryl-alkali compounds such as, for example, phenyllithium, or strongly basic amines (including ammonium bases, for example trialkylammonium hydroxides).

The new compounds defined above show a more or less pronounced fluorescence in the dissolved or finely divided state. They are preferentially used for the brightening of cellulose and polyamides, above all by the exhaustion process or pad-therm process. They can however also be used for the optical brightening of the most diverse synthetic, semi-synthetic or natural organic materials or substances which contain such organic materials.

The following groups of organic materials, where optical brightening thereof is relevant, may be mentioned as examples of the above, without the survey given below being intended to express any restriction thereto:

I. Synthetic organic high molecular materials:

a. Polymerisation products based on organic compounds containing at least one polymerisable carbon-carbon double bond, that is to say their homopolymers or copolymers as well as their after-treatment products such as, for example, cross-linking, grafting or degradation products, polymer blends, or products obtained by modification of reactive groups, for example polymers based on α,β-unsaturated carboxylic acids or derivatives of such carboxylic acids, especially on acrylic compounds (such as, for example, acrylic esters, acrylic acid, acrylonitrile, acrylamides and their derivatives or their methacryl analogues), on olefine hydrocarbons (such as, for example, ethylene, propylene, styrenes or dienes and also socalled ABS polymers), and polymers based on vinyl and vinylidene compounds (such as, for example, vinyl chloride, vinyl alcohol or vinylidene chloride).

b. Polymerisation products such as are, for example, obtainable by ring opening, for example, polyamides of the polycaprolactam type, and also polymers which are obtainable both via polyaddition and via polycondensation, such as polyethers or polyacetals, c. Polycondensation products or precondensates based on bifunctional or polyfunctional compounds possessing condensable groups, their homocondensation and co-condensation products, and after-treatment products, such as, for example, polyesters, especially saturated (for example ethylene glycol terephthalic acid polyesters) or unsaturated (for example maleic acid dialcohol polycondensates as well as their crosslinking products with copolymerisable vinyl monomers), unbranched or branched (also based on high-functional alcohols, such as, for example, alkyd resins) polyesters, polyamides (for example hexamethylenediamine adipate), maleate resins, melamine resins, their precondensates and analogues, polycarbonates and silicones d. Polyaddition products such as polyurethanes (cross-linked and non-cross linked) and epoxide resins.

II. Semi-synthetic organic materials such as, for example, cellulose esters of varying degrees of esterification (so-called 2½-acetate or triacetate) or cellulose ethers, regenerated cellulose (viscose or cuprammonium cellulose), or their after-treatment products, and casein plastics.

III. Natural organic materials of animal or vegetable origin, for example based on cellulose or proteins, such as cotton, wool, linen, silk, natural lacquer resins, starch and casein.

The organic materials to be optically brightened can be in the most diverse states of processing (raw materials, semi-finished goods or finished goods). On the other hand they can be in the form of structures of the most diverse shapes, that is to say, for example, as predominantly three-dimensional bodies such as sheets, profiles, injection mouldings, various machined articles, chips, granules or foams, and also as predominantly two-dimensional bodies such as films, foils, lacquers, coatings, impregnations and coatings, or as predominantly one-dimensional bodies such as filaments, fibres, flockds and wires. The said materials can, on the other hand, also be in an unshaped state, in the most diverse homogeneous or inhomogeneous forms of division, such as, for example, in the form of powders, solutions, emulsions, dispersions, latices, pastes or waxes.

Fibre materials can, for example, be in the form of endless filaments (stretched or unstretched), staple fibres, flocks, hanks, textile filaments, yarns, threads, fibre fleeces, felts, waddings, flock structures or woven textile fabrics or textile laminates, knitted fabrics and papers, cardboards or paper compositions.

The compounds to be used according to the invention are of importance, inter alia, for the treatment of organic textile materials, especially woven textile fabrics. Where fibres, which can be in the form of staple fibres or endless filaments or in the form of hanks, woven fabrics, knitted fabrics, fleeces, flock substrates or laminates, are to be optically brightened according to the invention, this is advantageously effected in an aqueous medium, wherein the compounds in question are present in a finely divided form, (suspensions, so-called micro-dispersions or possibly solutions). If desired, dispersing agents, stabilisers, wetting agents and further auxiliaries can be added during the treatment.

Depending on the type of brightener compound used, it may prove advantageous to carry out the treatment in a neutral or alkaline or acid bath. The treatment is usually carried out at temperatures of about 20° to 140°C, for example at the boiling point of the bath or near it (about 90°C). Solutions or emulsions in organic solvents can also be used for the finishing, according to the invention, of textile substrates, as is practised in the dyeing trade in so-called solvent dyeing (pad-thermofix application, or exhaustion dyeing processes in dyeing machines).

The new optical brighteners according to the present invention can further be added to, or incorporated in, the materials before or during their shaping. Thus they can for example be added to the compression moulding composition or injection moulding composition during the manufacture of films, sheets (for example milling into hot polyvinyl chloride) or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for example precondensates or prepolymers), that is to say before or during the polymerisation, polycondensation or polyaddition, Powdering onto polymer chips or granules for spinning compositions, Bath dyeing of polymer chips or granules for spinning compositions, Metered addition to spinning melts or spinning solutions, and Application to the tow before stretching.

The new optical brighteners according to the present invention can, for example, also be employed in the following use forms:

a. Mixtures with dyestuffs (shading) or pigments (coloured or especially, for example, white pigments), or as an additive to dyebaths or printing, etching or reserve pastes. Also for the after-treatement of dyeings, prints or resist prints.

b. Mixed with so-called "carriers", wetting agents, plasticisers, swelling agents, anti-oxidants, light protection agents, heat stabilisers, and chemical bleaching agents (chlorite bleaches or bleach bath additives).

c. Mixed with crosslinking agents or finishes (for example starch or synthetic finishes), and in combination with the most diverse textile finishing processes, especially synthetic resin finishes (for example creaseproof finishes such as "wash-and-wear", "permanent-press" or "no-iron"), as well as flameproof finishes, soft handle finishes, anti-soiling finishes or antistatic finishes, or antimicrobial finishes.

d. Incorporation of the optical brighteners into polymeric carriers (polymerisation, polycondensation or polyaddition products), in a dissolved or dispersed form, for use, for example, in coating compositons, impregnating compositons or binders (solutions, dispersions and emulsions) for textiles, fleeces, paper and leather, e. As additives to so-called "master batches".

f. As additives to the most diverse industrial products in order to render these more marketable (for example improving the appearance of soaps, detergents or pigments).

g. In combination with other optically brightening substances.

h. In spinning bath preparations, that is to say as additives to spinning baths such as are used for improving the slip for the further processing of synthetic fibres, or from a special bath before esterifying the fibre.

i. As scintillators for various purposes of a photographic nature such as, for example, for electrophotographic reproduction or supersensitisation.

If the brightening process is combined with textile treatment methods or finishing methods, the combined treatment can in many cases advantageously be carried out with the aid of appropriate stable preparations, which contain the optically brightening compounds in such concentration that the desired brightening effect is achieved.

In certain cases, the brighteners are made fully effective by an after-treatment. This can, for example, represent a chemical treatment (for example acid treatment), a thermal treatment (for example heat) or combined chemical/ theremal treatment. Thus, for example, the appropriate procedure to follow in optically brightening a series of fibre substrates, for example polyester fibres with the brighteners according to the invention is to impregnate these fibres with the aqueous dispersions (or, where appropriate, solutions) of the brighteners at temperatures below 75°C, for example at room temperature, and to subject them to a dry heat treatment at temperatures above 100°C, it being generally advisable additionally to dry the fibre material beforehand at a moderately elevated temperature, for example at not less than 60°C and up to about 130°C. The heat treatement in the dry state is then advantageously carried out at temperatures between 120° and 225°C, for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used according to the invention, relative to the material to be optically brightened, can vary within wide limits. A distinct and durable effect is already achievable with very small amounts, in certain cases, for example, amounts of 0.0001 per cent by weight. However, amounts of up to about 0.8 per cent by weight and at times up to about 2 per cent by weight can also be employed. For most practical purposes, amounts between 0.0005 and 0.5 per cent by weight are of preferred interest.

The new optical brighteners are also particularly suitable for use as additives for washing liquors or to industrial and domestic detergents, and can be added in various ways. They are appropriately added to washing liquors in the form of their solutions in water or organic solvents, or in a finely-divided form as aqueous dispersions. They are advantageously added to domestic or industrial detergents in any stage of the manufacturing process of the detergent, for example to the socalled "slurry" before spray-drying the washing powder or during the preliminary preparation of liquid detergent combinations. The brighteners can be added either in the form of a solution or dispersion in water or other solvents, or without an auxiliary as a dry brightener powder. The brighteners can for example be mixed, kneaded or ground with the detergent substances and mixed into the finished detergent in this way, however, they can also be sprayed, after solution or prior dispersion, onto the finished detergent.

Possible detergents are the known mixtures of detergent substances such as, for example, soap in the form of chips and powder, synthetics, soluble salts or sulphonic acid half-esters of higher fatty alcohols, higher and/or multiple alkyl-substituted arylsulphonic acids, sulphocarboxylic acid esters of medium to higher alcohols, fatty acid acylaminoalkyl— or —aminoarylglycerinesulphonates, phosphoric acid esters of fatty alcohols and the like. As builders it is possible to use, for example, alkali polyphosphates and alkali polymetaphosphates, alkali pyrophosphates, alkali salts of carboxymethylcellulose and other "soil redeposition inhibitors", and also alkali silicates, alkali carbonates, alkali borates, alkali perborates, nitrilotriacetic acid, ethylenediaminotetraacetic acid, and foam stabilisers such as alkanolamides of higher fatty acids. Furthermore, the detergents can, for example, contain: antistatic agents, skinprotecting agents which restore fat, such as lanolin, enzymes, anti-microbial agents, perfumes and dyestuffs.

The new optical brighteners have the particular advantage that they are effective even in the presence of active chlorine donors such as, for example, hypochlorite, and that they can be used, without significant loss of effects, in wash liquors with non-ionic detergents, for example alkylphenolpolyglycol ethers.

The compounds according to the invention are added in amounts of 0.005 – 1 percent or above, relative to the weight of the liquid or pulverulent finished detergent. Wash liquors which contain the indicated amounts of the optical brighteners claimed, on washing textiles of cellulose fibres, polyamide fibres, cellulose fibres with a high quality finish, polyester fibres, wool and the like impart a brilliant appearance in daylight.

The washing treatment is carried out, for example, as follows:

The textiles indicated are treated for 1 to 30 minutes at 20° to 100°C in a wash liquor which contains 1 to 10 g/kg of a built-up composite detergent and 0.05 to 1 percent, relative to the weight of the detergent, of the brighteners claimed. The liquor ratio can be 1:3 to 1.50. After washing, the textiles are rinsed and dried in the usual manner. The wash liquor can contain, as a bleaching additive, 0.2 g/l of active chlorine (for example as hypochlorite) or 0.1 to 2 g/l of sodium perborate.

EXAMPLE 1

4.0 g of sodium methylate are added over the course of 15 minutes to a well-stirred solution of 10.2 g of the 64 percent strength disodium salt of terephthalaldehyde-2,5-disulphonic acid and 15.8 g of p-chlorobenzylphosphonic acid diethyl ester in 60 ml of dimethylsulphoxide after having displaced the air by nitrogen. The temperature is kept at 40° to 45°C for about 3 hours and the solvent is distilled off in vacuo on a rotary evaporator. The residue is taken up in 20 ml of boiling water, 20 ml of saturated sodium chloride solution are added and the mixture is cooled to 0°C. The product which precipitates is filtered off, washed with about 15 percent strength sodium chloride solution and dried. 5.2 g of a light yellow product of the formula

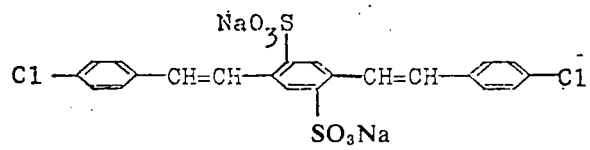

(12)

are obtained, and this is recrystallised from dilute aqueous sodium chloride solution, with the aid of active charcoal (giving pale yellow crystals).

The disodium salt of terephthalaldehyde-2,5-disulphonic acid

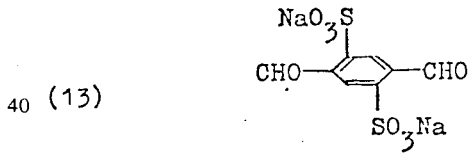

(13)

used as the starting product is obtained as follows:

30.1 g of 2,5-dichloroterephthalaldehyde in a solution of 43.3 g of 96 percent strength sodium sulphite in 500 ml of water are heated for 3 hours to 190°C in a stirred autoclave. 50 ml of concentrated hydrochloric acid are added dropwise, at the boil, to the solution which has been clarified by filtration (evolution of sulphur dioxide) and the solution is evaporated to about 300 ml (to the point that no sodium chloride crystallises out while the mixture is hot). After cooling and prolonged standing at 0°C, the product which has crystallised out is filtered off and dried in vacuo at 60°C: yield 19.4 g. The filtrate is evaporated to dryness on a rotary evaporator, the residue is taken up in 300 ml of dimethylformamide at 100°C, and the insoluble salt is filtered off. The filtrate is again evaporated to dryness, the residue is boiled up in 75 ml of isopropanol, the mixture is cooled to room temperature and the product is filtered off. After drying at 60°C, a further 16.3 g of less pure product are obtained.

EXAMPLE 2

The procedure described in Example 1 is followed but 3-chlorobenzyl-phosphonic acid diethyl ester, 3,4-dichlorobenzyl-phosphonic acid diethyl ester or 2,4-dichlorobenzylphosphonic acid diethyl ester are used as the phosphonate component. After appropriate working up, the compound of the following formulae are obtained:

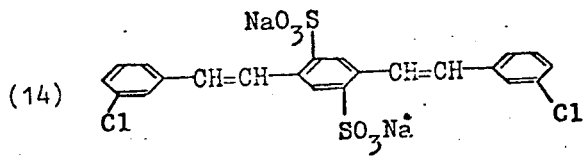

(14)

as pale yellow small needles (recrystallised from water with a little sodium chloride),

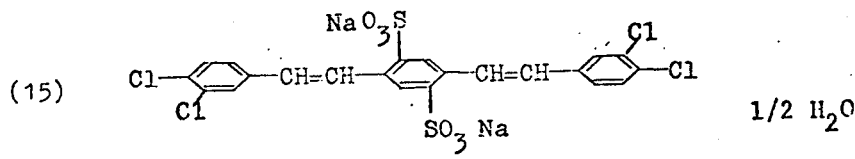

(15)

in the form of a light yellow, hygroscopic powder (recrystallised from alcohol-water), and

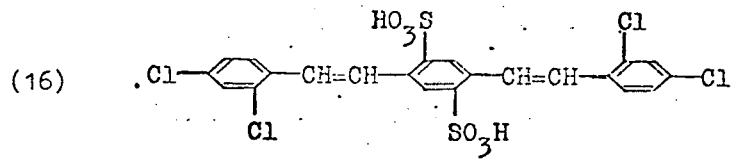

(16)

as yellow hygroscopic crystals (recrystallised from water - dilute hydrochloric acid).

On using potassium methylate or anhydrous potassium hydroxide instead of sodium methylate, and salting out with potassium chloride, the corresponding potassium salts are obtained. Equally, the corresponding phosphonic acid dimethyl esters can be employed instead of the phosphonic acid diethyl esters. Finally, dimethylsulphoxide can also be replaced by dimethylformamide or N-methylpyrrolidone.

EXAMPLE 3

A bleached cotton fabric is introduced, in a liquor ratio of 1:25, into a bath at 20°C which contains (relative to the fabric weight) 0.1 percent of one of the compounds of the formulae (12), (14) or (15). The mixture is warmed to 60°C over the course of 15 minutes and 5 g of crystalline sodium sulphate are then added per litre of liquor. After a further 15 minutes, the fabric is briefly rinsed and subsequently dried. The cotton treated in this way is strongly brightened and shows good fastness to light.

EXAMPLE 4

Bleached cotton fabric is washed for 15 minutes, using a liquor ratio of 1:20, in a liquor warmed to 30°C which contains the following additives per litre: 0.004 to 0.016 g of the brightener of the formulae (12), (14) or (15), 0.25 g of active chlorine (bleach solution) and 4 g of a washing powder of the following composition: 15.00 percent of dodecylbenzenesulphonate, 10.00 percent of sodium laurylsulphonate, 40.00 percent of sodium tripolyphosphate, 25.75 percent anhydrous sodium sulphate, 7.00 percent of sodium metasilicate, 2.00 percent of carboxymethylcellulose and 0.24 percent of ethylenediaminetetraacetic acid. The cotton fabric is only introduced into the wash liquor 15 minutes after preparation of the bath. After rinsing and drying, the fabric shows a good brightening effect of good fastness to acid, light and chlorine.

A good brightening effect is also obtained if the washing process is carried out in the same manner for 15 minutes at 50°C.

EXAMPLE 5

A polyamide fibre fabric (Perlon Helanca) is washed, using a liquor ratio of 1:20, for 15 minutes in a liquor warmed to 50°C, which contains the following additives per litre: 0.004 to 0.016 g of the brightener of the formulae (12) or (15), 0.25 g of active chlorine (bleach solution) and 4 g of a washing powder of the following composition: 15.00 percent of dodecylbenzenesulphonate, 10.00 percent of sodium laurylsulphonate, 40.00 percent of sodium tripolyphosphate, 25.75 percent of anhydrous sodium sulphate, 7.00 percent of sodium metasilicate, 2.00 percent of carboxymethylcellulose and 0.24 percent of ethylenediaminetetraacetic acid. The polyamide fibre fabric is only introduced into the wash liquor, warmed to 50°C, 15 minutes after preparation of the bath. After rinsing and drying, the fabric shows a good brightening effect of good fastness to light.

The brighteners of the abovementioned formulae can also be directly incorporated into the washing powder of the abovementioned composition.

EXAMPLE 6

A polyamide fibre fabric (Perlon) is introduced, in a liquor ratio of 1:40, into a bath at 100°C which contains (relative to the fabric weight) 0.1 percent of one of the brighteners of the formulae (12), (14) or (15) and, per litre, 1 g of 80 percent strength acetic acid and 0.25 g of an addition product of 30 to 35 mols of ethylene oxide to one mol of technical stearyl alcohol. The mixture is warmed to the boil over the course of 30 minutes and is kept thereat for 30 minutes. After rinsing and drying, a good brightening effect of good fastness to light is obtained.

If instead of the polyamide-6 fabric a polyamide-66 (nylon) fabric is used, similar brightening effects are obtained.

Finally, the process can also be carried out under high temperature conditions, for example for 30 minutes at 130°C. For this type of application, it is advisable to add 3 g/l of hydrosulphite to the liquor.

EXAMPLE 7

10,000 g of a polyamide, in chip form, manufactured from hexamethylenediamine adipate in a known manner, are mixed for 12 hours, in a tumbler vessel, with 30 g of titanium dioxide (rutile modification) and 5 g of the compound of the formula (16). The chips treated in this way are melted in a kettle heated with oil or diphenyl vapour to 300°–310°C, after displacing the atmospheric oxygen by steam, and the melt is stirred for half an hour. The melt is thereafter extruded under a nitrogen pressure of 5 atmospheres gauge through a spinneret and the filament which has been spun in this way and cooled is wound up on a spinning bobbin. The resulting filaments show good brightening effect.

If instead of a polyamide manufactured from hexamethylene adipate, a polyamide manufactured from ε-caprolactam is used, similarly good results are obtained.

EXAMPLE 8

Cut pieces of fabric or polyamide-6, bleached wool and "BEL-O-FAST"-finished cotton are together treated, using a liquor ratio of 1:20, for 10 minutes at 30°C in a bath which contains 0.1 percent of the brightener of the formula (12), (15) or (16), calculated relative to the fibre material, and 0.5 g/l of sodium fluosilicate.

After rinsing and drying, the three fibre materials show a strong brightening effect of good fastness to light.

EXAMPLE 9

A bleached wollen fabric is treated, using a liquor ratio of 1:40, for 60 minutes in a bath at 60°C which contains 0.1 to 0.4 percent of the brightener of the formulae (12), (14) or (15), calculated relative to the fibre weight, and 4 g/l of hydrosulphite. After rinsing and drying, strong brightening effects of good fastness to light are obtained.

Strong brightening effects are also obtained if instead of the hydrosulphite 5 percent of acetic acid, calculated relative to the fibre weight, are added to the bath.

EXAMPLE 10

A cotton article which has been given a non-iron finish by means of an aminoplast resin is washed, using a liquor ratio of 1:20, for 15 minutes in a liquor warmed to 60°C, which contains the following additives per litre: 0.004 to 0.016 g of the brightener of the formulae (12) or (15), 4 g of a washing powder of the following composition: 15.00 percent of dodecylbenzenesulphonate, 10.00 percent of sodium laurylsulphonate, 40.00 percent of sodium tripolyphosphate, 25.75 percent of anhydrous sodium sulphate, 7.00 percent of sodium metasilicate, 2.00 percent of carboxymethylcellulose and 0.25 percent of ethylenediaminetetraacetic acid. After rinsing and drying, the fabric shows a higher degree of whiteness in daylight than does the untreated material.

EXAMPLE 11

2 parts of resin size are added in a hollander to a paper pulp containing 100 parts of bleached cellulose. After 10 to 15 minutes, 0.05 to 0.3 part of the compound of the formula (12), dissolved in 20 parts of water, are first added, followed, after a further 15 minutes by 3 parts of aluminum sulphate. The pulp treated in this way is then passed via the mixing trough onto the papermaking machine, on which the paper is manufactured in a known manner. The paper thus obtained shows an excellent brightening effect of good fastness to light.

EXAMPLE 12

2 parts of resin size are added in a hollander to a paper pulp containing 100 parts of bleached cellulose. After 15 minutes, 3 parts of aluminum sulphate are further added. The paper web manufactured on the papermaking machine is now surface-sized by means of a "size press", using, as the adhesive starch or alginates which contain 0.05 to 0.3 part of the compounds of the formula (12). The paper thus obtained has a very high degree of whiteness.

I claim:

1. New distyrylbenzene derivatives of the formula

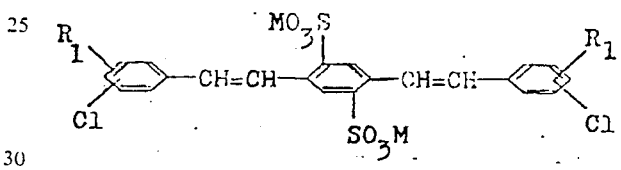

wherein $R_1$ represents hydrogen or chlorine and, if $R_1$ represents chlorine, the chlorine atoms assume the positions 2, 4 or 3, 4, and M denotes a hydrogen atom, an alkali metal ion or an ammonium ion.

2. The compound according to claim 1, corresponding to the formula

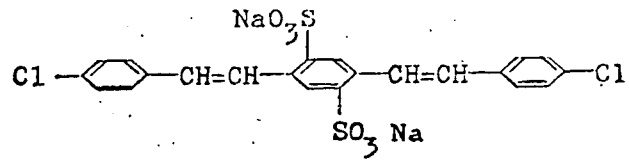

3. The compound according to claim 1, corresponding to the formula

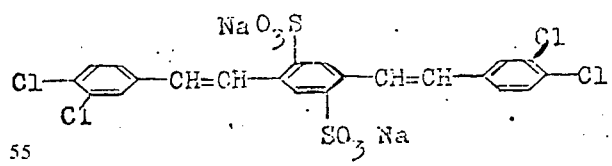

4. The compound according to claim 1, corresponding to the formula

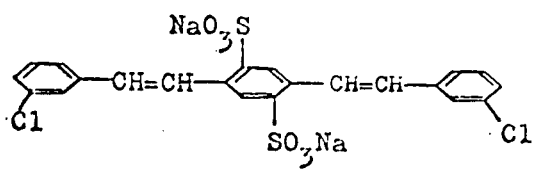

* * * * *